United States Patent [19]

Mattsson et al.

[11] Patent Number: 5,284,616
[45] Date of Patent: Feb. 8, 1994

[54] METHOD FOR ISOSTATIC OR PSEUDO-ISOSTATIC PRESSING EMPLOYING A SURROUNDING CASING OF GLASS

[75] Inventors: Bertil Mattsson; Jan Nilsson, both of Robertsfors; Marianne Collin, Enskede, all of Sweden

[73] Assignees: ABB Cerama AB; Sandvik AB, Sweden

[21] Appl. No.: 828,952

[22] PCT Filed: Dec. 12, 1991

[86] PCT No.: PCT/SE91/00854

§ 371 Date: Feb. 10, 1992

§ 102(e) Date: Feb. 10, 1992

[87] PCT Pub. No.: WO92/11107

PCT Pub. Date: Jul. 9, 1992

[30] Foreign Application Priority Data

Dec. 21, 1990 [SE] Sweden .................. 9004134-4

[51] Int. Cl.$^5$ .................. B22F 3/14; C04B 35/00; C04B 35/64
[52] U.S. Cl. .................. 419/44; 419/49; 419/38; 427/294; 264/62; 264/313; 264/317
[58] Field of Search .................. 419/35, 44, 49, 68, 419/38, 39; 264/62, 313, 317; 427/294

[56] References Cited

U.S. PATENT DOCUMENTS

| | | | |
|---|---|---|---|
| 3,710,953 | 1/1973 | Kirsch | 214/1 |
| 4,112,143 | 9/1978 | Adlerborn et al. | 427/191 |
| 4,339,271 | 7/1982 | Isaksson et al. | 419/49 |
| 4,478,789 | 10/1984 | Adlerborn et al. | 419/49 |
| 4,505,871 | 3/1985 | Adlerborn et al. | 264/325 |
| 4,507,262 | 3/1985 | Karas et al. | 419/2 |
| 4,550,034 | 10/1985 | Shimrock et al. | 427/243 |
| 4,568,516 | 2/1986 | Adlerborn et al. | 419/26 |
| 4,717,535 | 1/1988 | Adlerborn et al. | 419/38 |
| 4,778,650 | 10/1988 | Hermansson et al. | 419/38 |
| 4,793,968 | 12/1988 | Mosser et al. | 428/550 |
| 4,849,253 | 7/1989 | Maricle et al. | 427/115 |
| 4,853,101 | 8/1989 | Hruska et al. | 204/296 |
| 4,883,639 | 11/1989 | Adlerborn et al. | 419/49 |
| 4,987,105 | 1/1991 | Wright | 501/96 |
| 5,073,405 | 12/1991 | Vasilow et al. | 427/105 |
| 5,080,843 | 1/1992 | Larker et al. | 264/62 |
| 5,082,710 | 1/1992 | Wright | 428/76 |
| 5,089,197 | 2/1992 | Butler et al. | 264/65 |

FOREIGN PATENT DOCUMENTS

| | | |
|---|---|---|
| 0157651 | 10/1985 | European Pat. Off. . |
| 0238434 | 9/1987 | European Pat. Off. . |
| 0280874 | 9/1988 | European Pat. Off. . |
| 3322866 | 1/1985 | Fed. Rep. of Germany . |
| 1307214 | 2/1973 | United Kingdom . |

OTHER PUBLICATIONS

International Publication No. WO 81/02126, published Aug. 6, 1981 to Lars Bruce (Uddeholms Akte).

Primary Examiner—Donald P. Walsh
Assistant Examiner—Anthony R. Chi
Attorney, Agent, or Firm—Watson, Cole, Grindle & Watson

[57] ABSTRACT

A method for the manufacture of objects from powdered material by isostatic or pseudo-isostatic pressing. A porous body (10), with open pores in contact with the external surface(s), is preformed from a powdered material, whereupon at least one layer (11, 12) of a powdered material is applied onto the external surface of the preformed porous body by dipping. The preformed porous body is covered with a casing (13) of glass, or a material which forms glass upon heating, arranged outside the intermediate layer (12). The casing is made impenetrable to the pressure medium by heating, whereupon the preformed body is compacted to an essentially dense body. The pore system of the preformed porous body is evacuated by applying a sub-atmospheric pressure by means of at least one suction cup (21) which is applied on the external surface to be coated in connection with and during the dipping of the body in a slurry (20) of powdered materials included in the layer (11, 12).

19 Claims, 1 Drawing Sheet

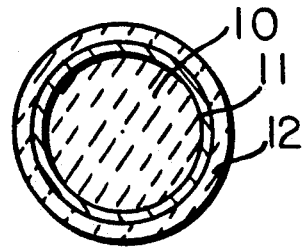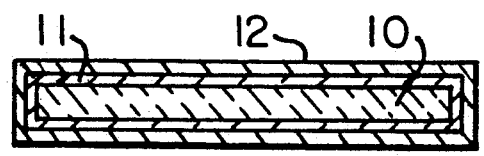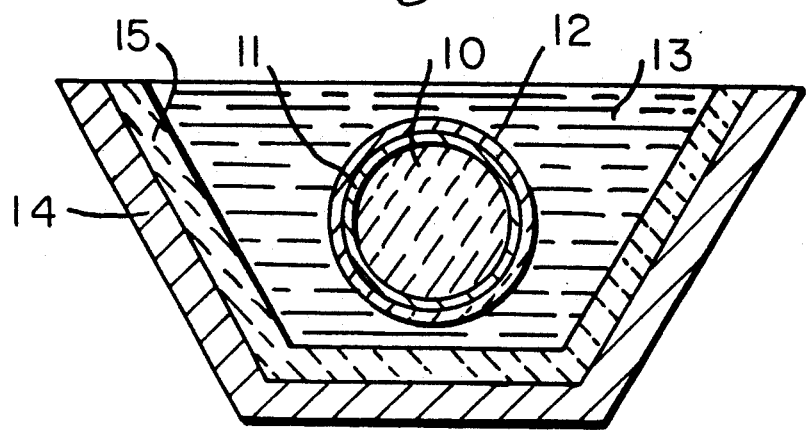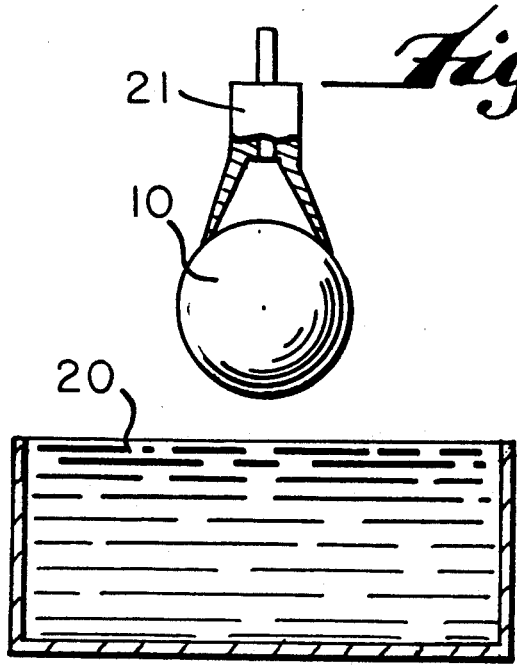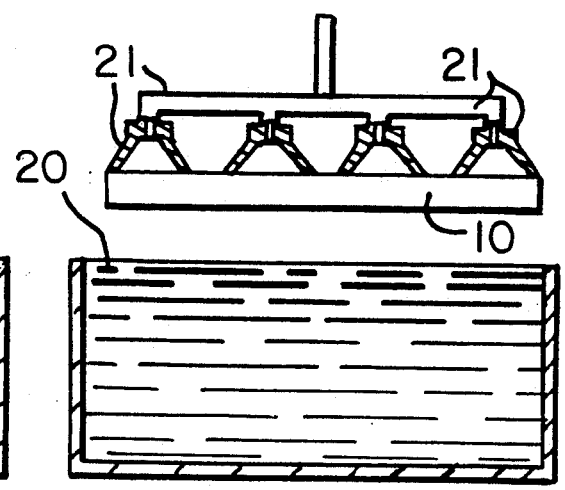

METHOD FOR ISOSTATIC OR PSEUDO-ISOSTATIC PRESSING EMPLOYING A SURROUNDING CASING OF GLASS

TECHNICAL FIELD

The present invention relates to a method for the manufacture of objects from a powdered material by isostatic or pseudo-isostatic pressing of a porous body preformed in the powdered material.

When a preformed porous body is compacted and consolidated by isostatic pressing and sintering, the desired density is obtained by surrounding the powder body by a dense deformable casing. The casing prevents the pressure medium used, normally a gas, from penetrating into the powder body. As casing there is often used a glass which is applied in the form of particles. Similarly, in connection with certain pseudo-isostatic compaction methods, a preformed body is surrounded by a dense, deformable casing, which is also able to function as a pressure-transferring medium.

After the glass has been applied around the body, the body and the glass powder are heated, usually under vacuum, to a temperature such that the glass particles form a dense, coherent casing around the preformed porous body. Problems will arise if glass penetrates into the pores of the porous body and/or reacts with superficially located portions of the body during the subsequent isostatic or pseudo-isostatic pressing.

More particularly, the invention relates to a method in the application of layers, by means of dipping. The layers are primarily intended to function as barrier and/or protective layers and prevent glass, from the casing, from penetrating into the pores of the preformed porous body and/or reacting with superficially located portions of the body. In the following these layers are referred to as intermediate layers, but the invention also relates to the application of other types of layers that supplement the intermediate layers, e.g. layers comprising materials intended to improve the release of the intermediate layer(s) and glass casing from the compacted and sintered body, in the following referred to as supplementary layer(s).

BACKGROUND ART

In connection with isostatic pressing into a fully dense body starting from a powdered material, a porous body is preformed by injection moulding, die pressing, slip casting or some other suitable forming method. Alternatively, the powder is filled into a container which, after the isostatic pressing, will give a body of the desired shape and size. However, the present invention relates to a method in the isostatic pressing of a preformed porous body. The above-mentioned preforming methods may be used in connection with pseudo-isostatic pressing.

To obtain an essentially dense body during isostatic pressing of a porous body, the body is enclosed in a coherent dense casing or enclosure to prevent the pressure medium used from penetrating into the pore system of the body. Usually, a glass or a material forming glass is used, which is applied in powdered state. Prior to compaction by isostatic pressing, the porous body and the glass powder are heated, the powdered glass or glass-forming material thus forming a dense coherent casing around the porous body. Problems will arise if glass from the casing penetrates, to varying extent, into the porous body and/or reacts with superficially located portions of the porous body in connection with the porous body being compacted or while the porous body is compacted.

During pseudo-isostatic pressing, a mechanical pressure is applied by means of one or more punches onto a powdered or liquid medium which transfers the press force from the punches into an essentially isostatic pressure acting on the preformed body.

From Swedish patent specification SE-B-456 651, it is known to apply one or more layers comprising powdered material onto the porous body. The layers are applied to the external surfaces of the porous body that are to be exposed to glass. In the following these surfaces are referred to as external surfaces. External surfaces in this context are all surfaces that define the shape of the body, i.e. also surfaces within open cavities, depressions and larger holes but not internal surfaces such as surfaces within the pore system. The layers are primarily applied in order to prevent the penetration of glass into the pores and/or prevent reactions between the glass and the porous body, intermediate layers. But layers are also applied for other purposes, e.g. to simplify the removal of the glass casing from the compacted, sintered, essentially fully dense body, supplementary layers.

It is important that the powder in an intermediate layer, possibly after certain reaction with the surrounding glass, at the pressing temperature functions as a dense, fully-covering barrier against the penetration of glass into the preformed body.

The application of an intermediate layer by spraying may be made to function; however, the material losses are considerable and therefore the method is too expensive in production.

However, the application of an intermediate layer by dipping, which is a preferred method of application from the point of view of production, often results in problems with bubbling and blistering, which entails holes in the intermediate layer. The bubbling or blistering is due to the pore system and is accentuated by coarse or unevenly distributed pores. Such a pore system is obtained, among other things, when using spray-dried powder. A particularly unfavourable pore system is obtained in material comprising whiskers, other needle- or disc-shaped single crystals or fibres. Attempts to eliminate these problems by conventional measures, such as closing surface pores with organic material, dipping under vacuum or modifications of the dipping process, such as cooled liquid and/or oscillating dipping, have only resulted in marginal improvements.

SUMMARY OF THE INVENTION

The invention aims to provide a solution of the above-described problems with blistering and the concomitant defects in the compacted body by the following steps during the manufacture of objects from a powdered material by isostatic or pseudo-isostatic pressing:

preforming a porous body from a powdered material, where said body comprises open pores in contact with external surfaces, applying at least one powdered layer, intermediate layer or supplementary layer, on said external surfaces of said porous body by dipcoating, covering the preformed and coated body by a casing of glass arranged outside said layer, making the casing impenetrable to the pressure medium by heating, and compacting and consolidating said preformed body into an essentially dense body by pressing the body isostatically or pseudo-isostatically and sintering it, wherein it has proved to be possible to produce an essentially dense body, free from the defects which are connected with bubbling and blistering resulting from an unfavourable pore structure or pore distribution, by the following steps according to the invention, when applying the layer by means of dipping:

evacuating the pore system of the preformed porous body by applying a sub-atmospheric pressure, applying said sub-atmospheric pressure by means of at least one suction cup, where said suction cup(s) is(are) applied onto one or more of the external surfaces to be coated, of the preformed porous body, and applying said sub-atmospheric pressure in connection with and during dipping of the body into a slurry of powdered materials included in the layer.

The suction cup, applied on said external surface, suitably at the same time serves as a holder for handling the body in connection with and during dipping of the preformed porous body in a slurry of powdered material included in the layer. By suction cup is meant, in the following, a suction device which makes close contact with the external surface to be coated, either by designing the suction cup in a flexible material, the suction cup then itself sealing against the external surface of the preformed body, or by arranging some form of sealing between the suction device and the surface mentioned.

By applying a suction cup onto said external surface of the preformed body according to the invention, and applying it in connection with and during the dipcoating, to handle the preformed body while at the same time applying a sub-atmospheric pressure in the pore system of the powder body, a considerable improvement of the quality of the layer is obtained, compared with dipping under the same conditions with the preformed body held with a pair of tweezers or other mechanical gripping or support devices. Also for porous bodies of material with unfavourable pore systems, an essentially even and blister-free layer is obtained. However, this favourable effect decreases with the distance from the suction cup, and therefore a number of suction cups, evenly distributed over said external surface(s) to be coated, are preferably applied when dipcoating large bodies.

When dipping the preformed porous body into a slurry of materials included in an intermediate layer or in a supplementary layer, the pore system of the porous body is evacuated with a sufficient sub-atmospheric pressure by applying at least one suction cup onto one or more of the surfaces(s) of the preformed porous body that is(are) to be coated. In addition to essentially eliminating the bubbling and blistering, caused by an unfavourable pore system in the body, by the application of the suction cup, also a rational handling of the preformed bodies is obtained during the application of the intermediate layer and/or the supplementary layer. To obtain a satisfactory result, the pore system is suitably evacuated with a sub-atmospheric pressure in the suction cup of between 100 and 800 mbar. A layer of desired thickness is obtained by repeating the dipping in a plurality of dipping operations, with or without intermediate drying. To ensure a fully covering coating of all external surface(s), the suction cup(s) will be moved and reapplied to a different position on the external surface(s) and the required dipping(s) repeated. Preferably the suction cup(s) is(are) moved and reapplied to an already coated part of the external surface(s). After drying, the preformed porous body is covered with a casing of glass, or a material which forms glass upon heating, arranged outside the layer. Before the preformed body is compacted and consolidated by isostatic or pseudo-isostatic pressing and sintering, the casing is made impenetrable to the pressure medium by heating.

The intermediate layers are intended to prevent the penetration of glass into the porous body, above all penetration of glass into open pores which are in contact with an external surface, in connection with the compaction and consolidation of the porous body. In most applications it is preferred that the intermediate layer in all essentials maintains a crystalline state in contact with both the glass casing and the porous body at the compaction temperature. Examples of materials, to be used on their own or in combinations, suitable for the intermediate layer, are;

intermediary phases in the system $Al_2O_3$—$SiO_2$, of which mullite $3Al_2O_3 \cdot 2SiO_2$, sillimanite $Al_2O_3 \cdot SiO_2$ and kyanite $Al_2O_3 \cdot SiO_2$ (a high-pressure modification of sillimanite) may be mentioned, and a powdered material comprising of one or more of substances such as aluminium oxide, zirconium oxide, titanium boride, silicon nitride, silicon carbide, titanium nitride, boron nitride. Particularly suitable for the intermediate layer are materials included in the porous preformed body. A high-melting glass which does not react, or only insignificantly reacts, with the material comprised in the intermediate layer can be added. As examples of applicable, high-melting kinds of glass may be mentioned quartz glass and a glass containing 96.7 per cent by weight $SiO_2$, 2.9 per cent by weight $B_2O_3$ and 0.4 per cent by weight $Al_2O_3$ (Vycor ®).

In one embodiment, the intermediate layer is supplemented by an inner layer, in the following termed supplementary layer, which, besides preventing the penetration of glass into the preformed porous body, also serves as release agent. The supplementary layer is arranged nearest the body and to improve the removal of the intermediate layer and the glass casing, after compaction and sintering, this supplementary layer comprises essentially boron nitride. Boron nitride has an insignificant tendency, or no tendency at all, to react with the solid ceramic and metallic materials which are usually used for the manufacture of objects by isostatic or pseudo-isostatic pressing starting from powder and is therefore easily removed from the compacted and sintered body since boron nitride has relatively low strength. Boron nitride of commercially available grades, which contain impurities, particularly boron oxide, in contents of up to 2 per cent by volume, is well suited for this purpose. As alternative to boron nitride it is possible, depending on the material to be compacted, to use other substances with a layered structure such as graphite as well as boron nitride mixed with silicon nitride, silicon carbide, titanium nitride, titanium boride, etc.

The particle size of the powder in the intermediate layer is suitably chosen to be between 0.1 and 200 μm, preferably to be less than 150 μm and the material is applied to form a layer with a thickness of between 0.1 and 3 mm, preferably to form a thickness between 0.3 and 0.6 mm.

For the supplementary layer, which is applied inside the intermediate layer, the particle size is suitably chosen to be between 0.1 and 100 μm, preferably to be less than 45 μm. The layer is suitably applied to form a thickness of between 0.1 and 2 mm, preferably to form a thickness of between 0.2 and 0.6 mm.

Both the intermediate layer and the supplementary layer are applied, according to the invention, to the porous preformed body by means of dipping in a slurry of the powdered materials which are included in the respective layers. The slurry is suitably prepared by the addition of a solvent such as cyclohexane, a ketone, ethanol or other alcohol, to a content of 80 to 92 parts by volume to the powdered material. Suitable dispersion and suspension promoting agents as well as other surface active agents are, of course, added to ensure that an essentially fully covering and even coating of the slurry remains on the body. The dipping is followed by a drying when the solvent is driven off and a covering, even layer of the desired thickness is obtained. Of course, a plurality of dipping operations, with or without intermediate drying, may be carried out to obtain the desired thickness of the layer. To ensure an even and covering coating of all external surface(s), the suction cup(s) will be moved and reapplied to a different position on the external surface(s) and the required dipping(s) repeated. Preferably the suction cup(s) is moved and reapplied to an already coated part of the external surface(s).

The powdered material from which the object is manufactured preferably comprises a ceramic or a metallic material, but may also comprise intermetallics or composites comprising mixtures of metallic and ceramic materials.

As examples of ceramic materials to which the invention is applicable may be mentioned, in addition to the materials exemplified below, boron carbide, titanium carbide, silicon carbide, etc.

Ceramic materials for which the present invention is particularly suitable are spray-dried ceramic powders or ceramic powders with additions of whiskers or other needle- and/or disc-shaped single crystals or fibres. Whiskers-reinforced ceramic objects, such as wear parts or tools for machining processes, will be described in more detail in the examples. The ceramic matrix preferably consist of aluminium oxide and aluminium oxide-based ceramics, zirconium oxide and zirconium oxide-based ceramics as well as silicon nitride and silicon nitride-based ceramics. The needle- and/or disc-shaped single crystals preferably consist of silicon carbide or carbides, borides and nitrides of titanium, hafnium, tantalum or niobium. To these materials there are added, when necessary, sintering promoting agents, grain growth inhibitors, etc.

The invention is of particular value in the manufacture of objects for which good surface properties such as surface hardness and wear resistance are an indispensable requirement and where surface defects such as irregularities, chippings or other fractures in the surface layer cannot be tolerated. Examples of products with such requirements are:

bearing parts, mainly comprising ceramic materials such as aluminium oxide and aluminium oxide-based ceramics, zirconium oxide and zirconium oxide-based ceramics, silicon nitride and silicon nitride-based ceramics, boron carbide and boron carbide-based ceramics, and titanium boride and titanium boride-based ceramics;

wear parts mainly comprising ceramic materials such as aluminium oxide or aluminium oxide-based ceramics, zirconium oxide or zirconium oxide based ceramics, silicon nitride or silicon nitride-based ceramics, boron carbide or boron carbide-based ceramics, titanium boride or titanium boride-based ceramics, or silicon carbide or silicon carbide-based ceramics;

parts of an internal-combustion engine, preferably comprising silicon nitride or silicon nitride-based ceramics;

parts of a gas turbine, preferably comprising silicon nitride or silicon nitride-based ceramics;

inserts for machining processes mainly comprising ceramic materials such as aluminium oxide or aluminium oxide-based ceramics, silicon nitride or silicon nitride-based ceramics, or titanium boride or titanium boride-based ceramics.

Ceramic inserts for machining processes, comprising a ceramic material mainly based on aluminium oxide, with the addition of whiskers or fibres made from silicon carbide or carbides, borides or nitrides of titanium, tantalum, hafnium or niobium, in contents of between 4 and 55 per cent by volume and preformed with chip breakers and means for clamping, for example in the form of holes or depressions, are manufactured, by means of the present invention, without expensive and time-consuming grinding and still meeting the high demands regarding surface properties, in particular the absence of surface defects which is a must in the high-demanding applications where ceramic inserts are used.

Metallic materials for which the invention is suitable are iron-, nickel- and cobalt-based alloys, as well as refractory metals such as molybdenum, tantalum, tungsten etc., or alloys based on refractory metals. Additions of, for example, whiskers or grain growth inhibitors are not unusual.

The invention is also applicable to intermetallic compounds, for example aluminides of titanium or nickel.

Among the types of glass which may be used for the casing around the preformed body may be mentioned a glass containing 80.3 per cent by weight $SiO_2$, 12.2 per cent by weight $B_2O_3$, 2.8 per cent by weight $Al_2O_3$, 4.0 per cent by weight $Na_2O$, 0.4 per cent by weight $K_2O$ and 0.3 per cent by weight CaO (Pyrex®), a glass comprising 20–60 per cent by weight $B_2O_3$, 80–40 per cent by weight $SiO_2$ and 0–6 per cent by weight $Al_2O_3$, further an aluminium silicate containing 58 per cent by weight $SiO_2$, 9 per cent by weight $B_2O_3$, 20 per cent by weight $Al_2O_3$, 5 per cent by weight CaO and 8 per cent by weight MgO, and mixtures of particles of substances such as $SiO_2$, $B_2O_3$, $Al_2O_3$ and alkali and alkaline earth metal oxide which form glass upon heating. Further there may be mentioned a glass containing 96.7 per cent by weight $SiO_2$, 2.9 per cent by weight $B_2O_3$ and 0.4 per cent by weight $Al_2O_3$ (Vycor®) and mixtures of particles which form glass upon heating.

The pressure and the temperature for the isostatic or pseudo-isostatic pressing and the sintering of a powdered material are, of course, dependent on the materials. Normally, the pressure amounts to at least 100 MPa whereas the temperature amounts to between 1000° and 2100° C., preferably to at most 1800° C.

BRIEF DESCRIPTION OF THE DRAWINGS

The present invention may be more fully understood with reference to the following figures, wherein FIGS. 1a and 1b show schematic diagrams of porous powder bodies which are coated with a supplementary layer and an intermediate layer;

FIG. 2 shows a schematic diagram of a crucible having a boron nitride layer, in which crucible, a porous body having a supplementary coating and an intermediate coating, is coated with a glass casing according to a method of the present invention; and FIGS. 3a and 3b show schematic diagrams of an apparatus which include at least one suction cup to hold a porous body while the body is dipped into a slurry according to a method of the present invention.

DESCRIPTION OF EMBODIMENTS AND DRAWINGS

The invention will be explained in greater detail with reference to the embodiments and the accompanying drawings.

As an alternative to compaction and consolidation by isostatic pressing in a high-pressure furnace as described in the following examples, a mechanical pressure may be applied to the glass melt with one or more punches, the glass melt then transferring the pressure as an essentially isostatic pressure to the preformed body. Such pseudo-isostatic compaction will be performed at essentially the same pressure and temperature as used during the isostatic pressing in the high-pressure furnace.

EXAMPLE 1

Powdered silicon nitride with a particle size of 0.1-2 $\mu$m and with an additive of 2.5 per cent by weight $Y_2O_3$ and 0.5 per cent by weight $Fe_2O_3$, was placed in a capsule of plastic, for example softened polyvinyl chloride or polyurethane. The capsule had essentially the same shape as the body which was preformed. The capsule was sealed and thereafter compacted at room temperature and at a pressure of around 300 MPa for a period of 5 minutes. After completed compaction, the capsule was removed and the preformed porous body was machined into the desired shape and dimension, which in the example was a body of spherical shape.

The porous powder body 10 with open pores in contact with an external surface, thus obtained and shown in FIG. 1a, had a spherical shape. The external surface of the preformed porous body was first coated with a supplementary layer 11 of boron nitride, and outside of this boron nitride layer 11 there was applied an intermediate layer 12 comprising 48 parts by volume powdered boron nitride and 52 parts by volume of the powdered glass Vycor®. The layers are shown in the figures with greatly exaggerated thicknesses. For application of the boron nitride layer 11 (see FIGS. 3a and 3b), the preformed porous body 10 was dipped into a slurry 20 containing 27.5 per cent by weight boron nitride, with a particle size of less than 45 $\mu$m, 4.6 per cent by weight of an acrylic binder and 67.9 per cent by weight 2-isopropanol. The boron nitride layer 11 was applied, free from blistering and bubbling, by evacuating the pore system of the body 10, in connection with and during the dipping of the porous silicon nitride body 10 in the described slurry 20, by means of at least one suction cup 21. The suction cup 21 was applied on the external surface of the body to be coated 10. The spherical silicon nitride body 10 was gripped, thus its pore system was evacuated, by means of a suction cup 21 whose diameter was at least 3/5 of the diameter of the body 10. The spherical body 10 was immersed more than 50% into the slurry 20, which was well deaerated and which was being stirred. The sub-atmospheric pressure in the suction cup was 550 mbar. The dipping was repeated three times until the layer 11 was 0.4 mm. The layer 11 on the half-coated body 10 was dried with a medium wave infrared heater. After the drying, the body 10 was turned over and again gripped, its pore system thus being evacuated on reapplication of the suction cup 21. The suction cup 21 was reapplied on the external surface of the coated part of the silicon nitride body 10. According to the procedure described earlier, the other half of the silicon nitride body 10 was coated with an overlap between the layers of 1-2 mm.

Thereafter an intermediate layer 12, comprising 48 parts by volume boron nitride and 52 parts by volume of the glass Vycor®, was applied, outside the boron nitride layer 11 similarly by dipping and while utilizing the invention. The body 10 was dipped into a slurry comprising 10.5 per cent by weight Vycor®, with a particle size less than 45 $\mu$m, 9.7 per cent by weight boron nitride, with a particle size less than 45 $\mu$m, 5.1 per cent by weight of an acrylic binder and 74.7 per cent by weight ethylmethyl-ketone. After drying the intermediate layer 12 had a thickness of 0.6 mm.

The preformed spherical body 10 with the applied boron nitride layer 11 and the intermediate layer 12 comprising a mixture of boron nitride and the powdered glass Vycor® was provided, as shown in FIG. 2, with a casing 13 of glass. The glass casing 13 was produced by arranging the body 10 together with glass particles in a graphite crucible 14, which was internally provided with a layer of boron nitride 15. The glass comprised 80.3 per cent by weight $SiO_2$, 12.2 per cent by weight $B_2O_3$, 8.2 per cent by weight $Al_2O_3$, 4.0 per cent by weight $Na_2O$, 0.4 per cent by weight $K_2O$ and 0.3 per cent by weight CaO. The crucible 14 with contents was placed in a furnace in which the binders in layers 11 and 12, the acrylates, were removed in vacuum while the temperature was successively raised to 600° C. and maintained at this temperature for a few hours. Thereafter, the crucible 14 with the preformed body 10 and the glass particles 13 was placed in a high-pressure furnace in which pressure can be generated by the supply of a gaseous pressure medium, for example argon, and in which the required temperature was achieved with conventional heating devices.

First the crucible 14 was heated to a temperature of between 1000° and 1200° C. at atmospheric pressure such that the casing 13 of glass formed a melt and became impenetrable to the gaseous pressure medium. Then the pressure was raised to 150 MPa and the temperature to between 1700° and 1750° C. and these conditions were maintained for a period of one hour.

EXAMPLE 2

The same procedure as described in Example 1 was used to manufacture objects of silicon nitride with higher contents of sintering-promoting agents, 6 per cent by weight $Y_2O_3$, 2 per cent by weight $Al_2O_3$, the balance being silicon nitride.

EXAMPLE 3

The same procedure as in Example 1 was used to manufacture blades of silicon nitride for gas turbines with addition of 4 per cent by weight $Y_2O_3$, 0.2 per cent by weight $Fe_2O_3$ and 0.5 per cent by weight $SiO_2$. The blades were gripped and their pore system was evacuated by means of a plurality of suction cups 21, which were applied evenly distributed over the upper external surface of the blades 10 during and in connection with the application, by dipping, of the boron nitride layer 11 and the intermediate layer 12.

EXAMPLE 4

The same procedure as described in Example 1 was used to manufacture objects, for example ceramic cutting tools or ceramic inserts, of a silicon nitride-based ceramic comprising 97 per cent by weight silcon nitride, 2.5 per cent by weight yttrium oxide and 0.5 per cent by weight iron oxide.

EXAMPLE 5

To powdered aluminium oxide there was added 25 per cent by weight silicon carbide in the form of whiskers, whereupon two mixtures, one with and one without pressing agent, were spray-dried into agglomerates with a size of approximately 50 μm.

Agglomerated material without pressing agent was pressed and sintered into a disc, by means of uniaxial hot-pressing at 1850° C. and 30 MPa. From the disc, blanks for inserts were cut and ground into circular inserts with a diameter of 6 mm and a rake angle of 5°.

Agglomerated material with pressing agent was formed into a body 10 with a special geometry in a die. The preformed body 10 was heat-treated in a combined binder removal and presintering cycle with a final temperature of 1300° C. The presintered body 10 was gripped with a suction cup 21 and the pore system of the body evacuated by application of a sub-atmospheric pressure of 550 mbar. The sub-atmospheric pressure was applied through the suction cup 21. The body 10 was then dipped according to the description of Example 1, the pore system of the body 10 was maintained evacuated during and in connection with the dippings, first in a slurry 20 of boron nitride and then in a slurry 20 of mullite. The body 10 provided with two layers 11, 12 was thereafter placed in a glass powder bed 13 enclosed within a graphite crucible 14. The crucible 14 with its contents was placed in a high-pressure furnace, the binders in the layers were removed according to Example 1, and the temperature was raised to between 1000° and 1200° C. at atmospheric pressure so that the glass 13 melted and became impenetrable to the pressure medium. The pressure was raised to 160 MPa and the temperature to 1550° C. and these conditions were maintained for one hour.

After cooling, the glass and the protective layer were removed, and the cutting part of the body 10 was ground into a diameter of 6 mm.

Before a test turning operation, both types of inserts received an edge-rounding of 30 μm. The turning test was carried out in a heat resistant material, INCONEL ®718, at a cutting speed of 200 m/min. with a depth of cut of 1 mm and a feed of 0.15 mm/rev. Both types of inserts exhibited the same good resistance to flank and notch wear and showed no tendency to edge chipping or fracturing.

The inserts produced by hot-isostatic pressing according to the invention exhibited none of the surface defects which usually occur if the surface of the insert has been damaged by the penetration of glass in connection with the hot-isostatic pressing.

This test shows that by applying the protective layers according to the invention, inserts are obtained which meet the high demands placed on them by metal-cutting processes and that inserts manufactured according to the invention are essentially free from defects originating from the manufacturing process. In addition, the inserts can be formed directly with the desired geometry, such as chip breakers and means for clamping in the form of holes or depressions, which normally would require expensive and time-consuming subsequent machining of the blanks.

We claim:

1. A method for the manufacture of objects from powdered material by isostatic or pseudo-isostatic pressing, wherein a porous body, with open pores, is preformed from a powdered material;

at least one layer of a powdered material is applied on the external surface of the preformed porous body by dipcoating;

whereupon the preformed porous body is covered with a casing of glass, or a material forming glass upon heating, arranged outside and surrounding said layer;

the casing is made impenetrable to the pressure medium, by heating, and the preformed body with surrounding casing is compacted and consolidated into an essentially dense body by isostatic or pseudo-isostatic pressing and sintering, wherein the pore system of the preformed porous body is evacuated by applying a sub-atmospheric pressure, the sub-atmospheric pressure is applied by means of at least one suction cup, wherein said suction cup is applied onto one or more of the external surfaces to be coated, and that the sub-atmospheric pressure is applied in connection with and during the dipping of the body into a slurry of powdered materials included in the layer.

2. A method according to claim 1, wherein the pore system of the preformed porous body is evacuated with a sub-atmospheric pressure in the suction cup amounting to between 100 and 800 mbar.

3. A method according to claim 1, wherein the external surface of the preformed porous body is coated with an intermediate layer in the form of a powdered material that functions as a barrier or protective layer and prevents glass from penetrating into the pores of the body and/or reacting with superficially located portions of the body.

4. A method according to claim 1, wherein the external surface of the preformed porous body is coated with a supplementary layer which substantially constitutes a release agent for the glass casing and preferably comprises a material which has no tendency, or insignificant tendency, to react with the body under the sintering conditions.

5. A method according to claim 4, wherein a supplementary layer is arranged in immediate contact with the external surface of the preformed porous body and that the supplementary layer is adapted to be easily removed from the body together with the external layer and the glass casing after the isostatic or pseudo-isostatic pressing in that the supplementary layer contains at least boron nitride or another crystalline substance with a layered structure, such as graphite.

6. A method according to claim 1, wherein the preformed porous body with the layer applied on the body is placed in a crucible with powdered glass or a glass-forming material, that the binders and other organic substances used are removed, that the temperature is raised to between 1000° and 1200° C., the glass thus forming a casing around the body which is impenetrable to the pressure medium used, and that thereafter the body is compacted and consolidated isostatically or pseudo-isostatically at a pressure exceeding 100 MPa and a temperature of between 1000° and 2100° C.

7. A method according to claim 1, wherein the body is compacted and consolidated, by isostatic or pseudo-isostatic pressing and sintering, to a bearing component.

8. A method according to claim 7, wherein the bearing component is a ball and that the ball substantially comprises silicon nitride, aluminium oxide, zirconium oxide, boron carbide, titanium boride or a ceramic material based on one or more of these materials.

9. A method according to claim 1, wherein the body is compacted and consolidated, by isostatic or pseudo-isostatic pressing and sintering, to a wear part.

10. A method according to claim 9, wherein the wear part substantially comprises of silicon nitride, aluminium oxide, zirconium oxide, boron carbide, titanium boride, silicon carbide or a ceramic material based on one or more of these materials.

11. A method according to claim 9, wherein the wear part is a composite of ceramic materials and that the ceramic material contains fibres or needle-shaped and/or disc-shaped single crystals, for example comprising silicon carbide or carbides, borides and nitrides of titanium, tantalum, hafnium or niobium.

12. A method according to claim 1, wherein the body is compacted and consolidated, by isostatic or pseudo-isostatic pressing and sintering, to a component part of an internal-combustion engine and that the ceramic material is preferably based on silicon nitride.

13. A method according to claim 1, wherein the body is compacted and consolidated, by isostatic or pseudo-isostatic pressing and sintering, to a component part of a gas turbine and that the ceramic material is preferably based on silicon nitride.

14. A method according to claim 1, wherein the body is compacted and consolidated, by isostatic or pseudo-isostatic pressing and sintering, to a tool insert.

15. A method according to claim 14, wherein the tool insert substantially comprises silicon nitride or titanium boride.

16. A method according to claim 14, wherein the tool insert substantially comprises aluminium oxide.

17. A method according to claim 14, wherein the ceramic tool insert comprises fibers or needle-shaped and/or disc-shaped single crystals, preferably comprising silicon carbide or carbides, borides and nitrides of titanium, tantalum, hafnium or niobium, in contents amounting to between 4 and 55 percent by volume.

18. A method according to claim 14, wherein the ceramic insert is provided with chip breakers.

19. A method according to claim 14, wherein the ceramic insert is provided with means for clamping.

* * * * *